March 16, 1926.   1,577,049
N. THUESEN
FLUID BRAKE
Filed Feb. 24, 1925    3 Sheets-Sheet 1

INVENTOR
NIELS THUESEN
By
ATTORNEY

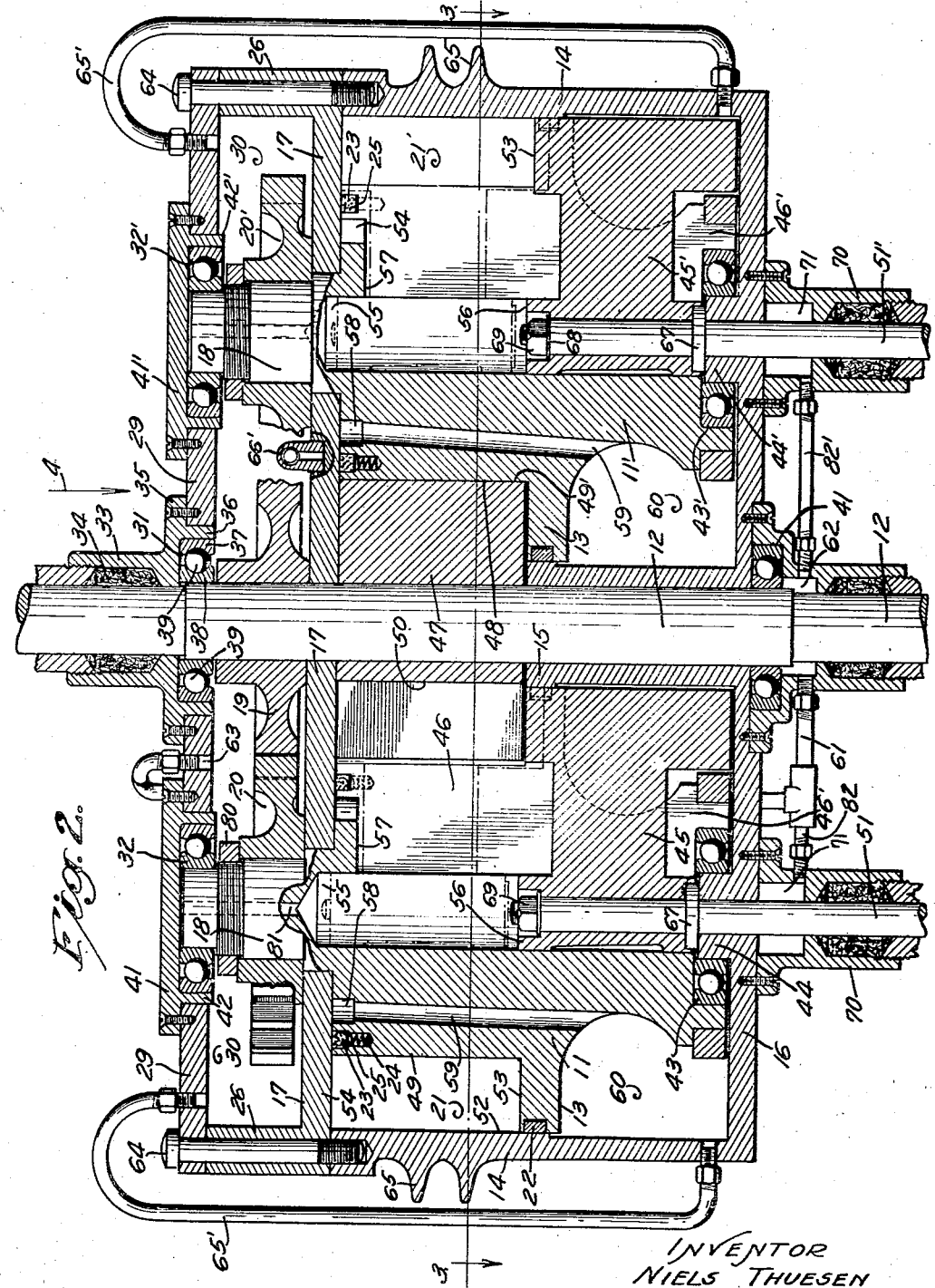

March 16, 1926.
N. THUESEN
FLUID BRAKE
Filed Feb. 24, 1925
1,577,049
3 Sheets-Sheet 3
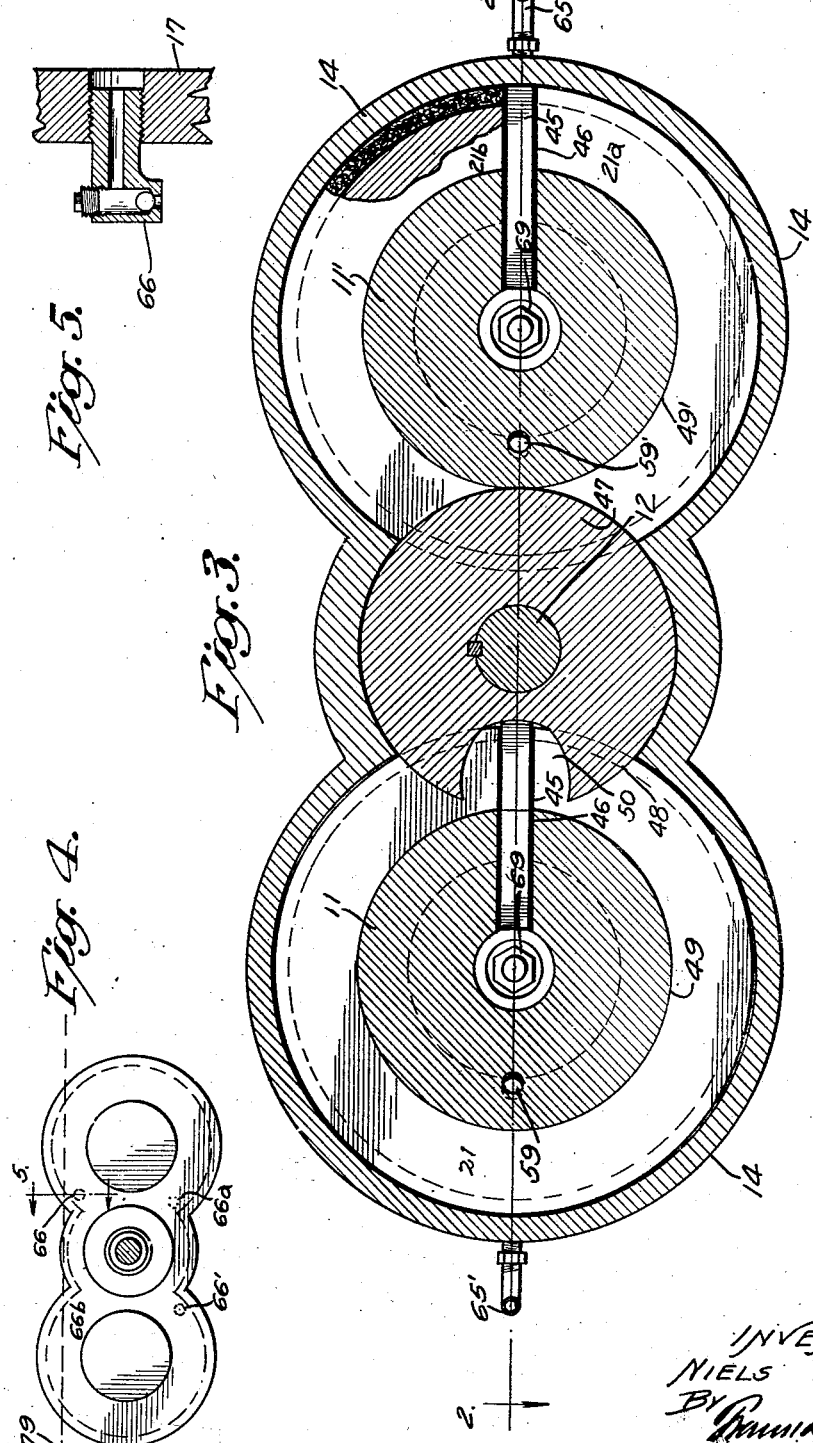
INVENTOR
NIELS THUESEN
BY
ATTORNEY Patented Mar. 16, 1926.

1,577,049

UNITED STATES PATENT OFFICE.

NIELS THUESEN, OF LOS ANGELES, CALIFORNIA.

FLUID BRAKE.

Application filed February 24, 1925. Serial No. 11,139.

*To all whom it may concern:*

Be it known that I, NIELS THUESEN, a subject of the King of Denmark, residing at Los Angeles, in the county of Los Angeles, State of California, have invented a new and useful Fluid Brake, of which the following is a specification.

My present invention being referred to as a fluid brake, it may be understood to be an object of this invention to provide simple and effective hydraulic means for checking the rotation of a shaft, such as a shaft extending from the transmission of a motor truck, or the like, toward a driven axle; and a preferred embodiment of my invention may comprise parts suitable for direct substitution in place of, for example, a band brake organization such as has been used on heavy motor trucks,—the Mack "dual reduction drive" being cited by way of illustration.

It is an object of this invention to provide a fluid brake comprising a pair of substantially cylindrical oil chambers containing rotatable elements respectively provided with vanes movable longitudinally thereof, and adapted both to act as sweeps, tending to impart movement to the contained oil and to act as obstructions tending to prevent such movement, and thereby effective to check the rotation of any part, such as a drive shaft, with which the mentioned rotatable elements may be operatively connected.

It is a further object of my invention to provide a hydraulic brake comprising a pair of vanes secured to longitudinally movable rods, the latter being connected, by means such as a cross-head, in such manner as to permit manipulation and complete control of the same by means such as a hand lever or foot pedal, within reach of a driver.

It is a further object of my invention to provide a simple and reliable hydraulic brake especially suitable for use as a service brake, comprising or adapted to be equipped with means for cooling the same, my preferred construction being such as to assure an avoidance of shocks and a complete and easy manual control.

Other objects of my invention will be better understood from the following description of a preferred embodiment thereof, taken in connection with the appended claims and the accompanying drawings, in which Fig. 1 is a top plan view of a truck, with parts stripped away to show one advantageous position in which my brake may be installed, when used in the manner above specifically referred to.

Fig. 2 is a horizontal sectional view, taken substantially as indicated by the line 2—2 of Fig. 3.

Fig. 3 is a vertical sectional view, taken substantially as indicated by the line 3—3 of Fig. 2.

Fig. 4 is an end elevational view, on a reduced scale, taken substantially as indicated by the arrow 4 of Fig. 2, and omitting optional details.

Fig. 5 is a detail view of an optional valve construction, this view being taken in the plane indicated by the line 5—5 of Fig. 4.

Figure 1:
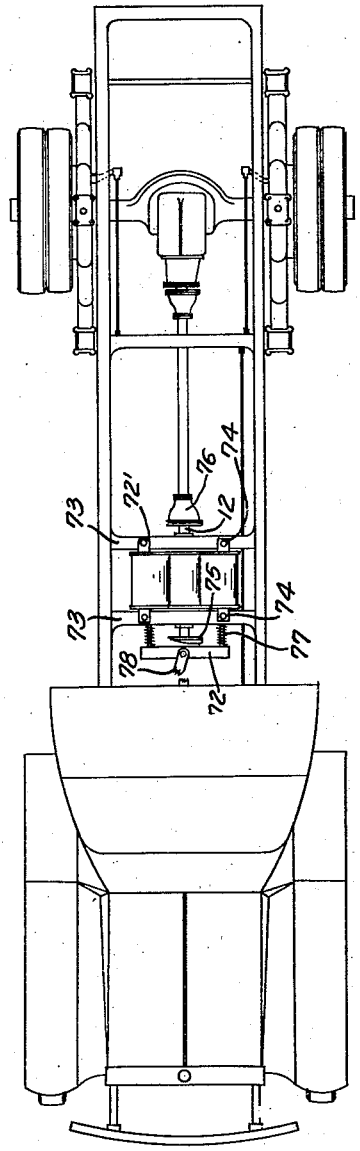

Referring to the details of the illustrated embodiment of my invention, in which I employ a pair of symmetrically disposed and preferably balanced rotatable bodies 11, 11' constantly driven during the rotation of the shaft 12, whose motion is to be controlled, each of the mentioned rotatable bodies or rotors may comprise a full-diameter portion 13, just clearing the interior of one of a corresponding pair of parti-cylindrical chambers. These chambers may comprise outer walls 14 and a central web 15, through which may extend one end of the shaft 12. The web 15 may be integral with an inner end plate 16, which may optionally be structurally continuous with the walls 14; and one end of the shaft 12 may be carried through an opposite transverse end plate 17; through which the reduced ends 18 of the respective rotors 11, 11' are shown as projecting. Upon the shaft 12 and the reduced ends 18 of the rotors 11, 11', I may secure intermeshing gears 19, 20 and 20'. It will be understood that the plate 17, or its equivalent, is adapted to confine a fluid, such as oil, within fluid chambers 21, 21'; and undesired movements of fluid to and from these chambers may be prevented by means such as the packing rings shown at 22 and 23, the latter being shown as pressed upward by means of springs 24 engaging an annular band 25 beneath the same.

If desired, the transverse plate 17 may be provided with an upstanding rim 26, at the outer edge thereof in such manner as to cooperate with a cover plate 29, in providing a gear chamber 30; and the cover plate 29 may advantageously be employed to support a central bearing 31 for the shaft 12 and lateral bearings 32, 32', for the reduced ends of the respective rotors 11, 11'. The mentioned bearing 31 may comprise a casting 33 adapted to serve as the outer element of a gland containing packing 34; and it may also comprise, in addition to a lateral flange 35 by which it may be secured, an inwardly extending ring 36 adapted to retain one of a pair of cooperating races 37, 38, to receive the balls 39; and a substantially similar construction may advantageously be employed in connection with a bearing 40, shown as secured to the inner end plate 16. The bearings 32, 32' are shown as comprising removable plates 41, 41', integral with rings 42, 42', for the retention of ball races; but the inner ends of the respective rotors 11, 11' are respectively shown as chambered at 43, 43', to receive ball races respectively surrounding annular bosses 44, 44', shown as integral with the inner end plate 16.

It should be understood that although the described arrangement of bearings is believed to be highly advantageous, any preferred equivalent construction may be substituted therefor, more essential features of my invention being the use, in conjunction with rotors 11, 11', or their equivalents, of longitudinally movable vanes 45, 45' respectively slidable within slots 46 in said rotors, and the use of a single drum 47, of such size that its cylindrical surface 48 normally contacts with corresponding surfaces 49, 49', upon the respective rotors 11, 11', this drum 47 being shown as provided with a single arcuate notch 50, adapted to receive successively the respective vanes 45, 45', whenever the latter are advanced from the inner positions in which they are shown in solid lines in Fig. 2, toward or to the dotted line positions indicated therein. The drum 47, or its equivalent, being keyed or otherwise rigidly secured to the shaft 12, and the movements of the rotors 11, 11' and shaft 12 being rendered interdependent by means of the general character described, it will be obvious that oil or another fluid confined within the chambers 21, 21' may ordinarily serve, when the respective vanes 45, 45' occupy their retracted positions, merely as a lubricating fluid; but whenever the mentioned vanes are, during the rotation enforced by their relationships with the respective rotors, advanced longitudinally of said rotors, as by means of rods 51, 51', it will be obvious that said vanes tend increasingly to impart movement to the oil engaged thereby; and that, no outlet being provided, when the vanes are completely advanced to their dotted line positions, the oil confined between the arcuate surfaces 49 and 52 and the end surfaces 53 (of rotors 11, 11') and 54 (of the transverse plate 17), the substantial incompressibility of the confined oil must tend to bring the vanes and thereby the rotors 11, 11' and the shaft 12, promptly to a stop.

My described brake is intended primarily for use as a service brake, to be applied in checking the momentum of a vehicle or in restraining the movements thereof, rather than for the purpose of holding a machine stationary on a road; and it is accordingly an advantageous feature of the described organization that any desired braking effect may be promptly or gradually obtained by applying like and simultaneous movements to the mentioned rods 51, 51' or equivalents. In order positively to prevent an unduly sudden application of my brake, I may optionally provide a minor chamber 55, into which a hub 56, integral with which vanes 45, 45' may extend, this hub being adapted to serve as a plunger forcing oil outward through a small pore or duct 81, the diameter of this pore or duct being such as positively to prevent an unduly rapid movement of the hub or plunger, or of the vanes connected therewith, after said hub or plunger shall be advanced beyond the plane of the surface 57, marking its entrance into the chamber 55.

In order to permit an equalization of pressure above and below the vanes 45, 45', I may optionally employ means such as annular ducts 58, shown as communicating with both the slots 46, within which the said vanes are longitudinally movable, and with longitudinal passages 59, opening into chambers 60, from which oil may be permitted freely to pass, as by way of the bearing chambers 43, to the lower or inner portions 46' of the mentioned slots 46. It will be obvious that the positions and characteristics of the bearings described and illustrated are in general such as to provide for the continuous and automatic lubrication of the same by means of the oil, or the like, confined within the respective chambers of my brake organization; and, to provide for the suitable lubrication of the bearings 40, which are less accessibly positioned for lubrication in the manner just referred to, I may optionally permit a comparatively free leakage along the shaft 12 thereto; and I may optionally provide a relief and oil saving return pipe 61, shown as leading from a chamber 62, and communicating at 63 with the gear chamber 30. The mentioned cover 29, for this gear chamber, and the remaining parts thereof, comprising the transverse plate 17, and the rim 26 may optionally be retained in place by means such as screws 64; and additional circulation, or a cooling effect, may be obtained by means such as fins 65, (Fig. 2 only) or pipes 65', shown as extending between the chambers 60 and 30, oil for the described system being replenished, (by means not shown) either continuously or intermittently; and a return flow of oil from the gear chamber 30 to the interior chamber 21 may optionally be provided for in any suitable way, as by means of check valves 66, 66', shown as secured in the transverse plate 17.

It will be obvious that, unless the vanes 45, 45' are freely rotatable relatively to the rods 51, 51' shown as co-axial with the respective rotors, on which they may be secured between collars 67 and washers 68 retained by nuts 69, or the like, these rods themselves must be capable of rotation; and, in any event, I consider it advantageous to provide the said rods with external glands 70, which may optionally be associated with oil collection pockets 71; and the rods 51, 51', or equivalents, may be operated by any preferred means adapted to effect their simultaneous advance and retraction.

For example, said rods may be interconnected and reciprocated by means such as a cross head 72 (see Fig. 1); and my entire brake organization, or its equivalent, may be suspended, by means such as straps or brackets 72', from the transverse frame element 73 of a truck or other car, it being intended that the dimensions of such embodiments of my invention as are to be substituted in trucks initially equipped with inferior brakes shall be capable of fitting conveniently into the space provided therefor. For example, in the case referred to, the identical bolt holes and bolts 74 previously used to support a band brake may optionally be employed to support my hydraulic brake; and the shaft 12 may be of such length as exactly to fit between couplings, such as universal joint couplings 75, 76, provided for use with the original brake organization. Any desired means, functionally equivalent to the compression springs 77, shown diagrammatically as surrounding the rods 51, 51', may be employed normally to hold the cross head 72, and thereby the vanes 45, or their equivalents, in their inner or inoperative positions; and means such as a reach rod or link 78 may be employed to connect the cross head 72, or its equivalent, with a suitable lever or pedal, or the like, (not shown) suitably positioned for manipulation by the driver of the truck or the vehicle.

Although I have shown and described my invention as applied to the control of a truck, it will be understood that this invention is generally applicable to any use requiring simple and reliable manual or automatic control of the rotation of a shaft, the inward movement of the vanes 45, 45', or equivalents, however produced, being effective not only to impart movement to a fluid within the chamber 21, but also correspondingly to diminish the freedom of movement of said fluid, the advance of a fluid impelled by vanes 45, 45' being in general prevented by the contact of the cylindrical surface 48 of the drum 47 with the co-operating surface 49 of a rotor, and the return of the oil or other fluid past the respective vanes being obstructed in proportion as the said vanes are forced away from the inner end plate 16 and toward their dotted-line positions. It will be understood that the respective vanes 45, 45' alternately enter the single arcuate notch 50, whose curvatures may advantageously be such as to effect a tight closure therewith, the said notch and the respective vanes interfitting substantially in the manner of properly designed gear teeth. The normal rotation of the rotors 11, 11', and the drum 47, may effect a comparatively slight disturbance in the oil or other liquid with which the inner chambers of my brake organization may be completely filled; and any desired quantity of air, to allow for thermal expansion, may be confined in the upper portions of the gear chamber or chambers 30,—a suitable oil level being indicated by the line 79, Fig. 4. The respective check valves 66, 66' are intended to be inserted in any suitable positions below the level of the oil or other liquid in the gear chamber 30, and when my brake system is to be used in connection with a shaft frequently rotated in a reverse direction, as in the backing of a truck, or the like, down a long hill, additional check valves may optionally be inserted at such points as 66$^a$ and 66$^b$, Fig. 4.

In order to offset any undue weakening effect such as might result from the longitudinal slotting of the rotors 11, 11', I may optionally provide one or both ends of the same with reinforcements, such as rings of a tough steel, or the like, cast or otherwise inserted therein; but it will be obvious that my described construction is especially advantageous in its avoidance of sudden shocks. In this connection, I may call attention to the fact that such embodiments of my invention, as are intended for use as service brakes, may be so constructed as to provide substantial clearance at practically all points. For example, even if the clearance permitted in the notch 50 is such as to allow considerable leakage at this point, since only one of the vanes 45, 45' can, at any given moment, enter this notch, at least one vane may always be exerting or ready to exert a braking effect. When, as in Fig. 3, the vane 45 is in the notch 50, the vane 45' may, by its rotation, effectively exert pressure on the substantially incompressible fluid in the space 21$^a$ (or in the space 21$^b$, according to the direction of rotation); and, in proportion as the longitudinal advance of the vane prevents movement of fluid between the spaces 21ª, 21ᵇ, constantly changing in volume, the rotation of these vanes in their respective particylindrical chambers is retarded.

Details such as the described arrangement of interior passages and the exact manner of stepping of that end of the rotors 11, 11' which extends through the transverse plate 17 and carries the gear 20, shown as secured by a nut 80, may be regarded as subject to wide variation in design; but, although it is not necessary that leakage be entirely prevented by means such as the described packings 22, 23', the attainment of a substantial balance and the provision of adequate cooling means may, in some cases, be matters of considerable practical importance.

In connection with the points last referred to, it should be understood not only that the pipes 65', or their equivalents, may be of any required number and dimensions, and that cooling jackets or fans or both (not shown) may optionally be employed in a known manner, but also that the pipe or pipes 61, serving for the purpose referred to (and optionally communicating, as by pipes 82, 82', with the oil collection pockets 71 as well as the chamber or pocket 62) may serve not only to avoid high pressures on the packings in the respective glands but to contribute to a cooling effect.

Although I have herein described a single preferred embodiment of my invention, I am aware that certain features thereof may be independently used and that various changes and modifications may be made, by those skilled in the art to which this case relates, without the slightest departure from the spirit and scope of my invention, as the same is indicated above and in the following claims.

I claim as my invention:

1. A hydraulic brake comprising: particylindrical fluid chambers disposed laterally with reference to a shaft whose rotation is to be controlled; rotors therein, driven from said shaft and cooperating with a transverse plate in defining fluid spaces; a notched drum rotated by said shaft and also cooperating with said rotors; vanes movable longitudinally of said rotors; and means for shifting said vanes longitudinally of said rotors.

2. An organization as defined in claim 1 in which said parti-cylindrical chambers constitute a pair symmetrically disposed.

3. An organization as defined in claim 1 in which said shaft and the associated parts are of such dimensions as to permit the substitution of the same for the corresponding elements of a band brake heretofore secured to a truck frame.

4. An organization as defined in claim 1 in which said rotors are stepped and extend through said transverse plate.

5. An organization as defined in claim 1 in which said rotors are stepped and extend through said transverse plate and are provided with gears meshing with a gear on said shaft.

6. An organization as defined in claim 1 in which said rotors are stepped and extend through said transverse plate and are provided with gears meshing with a gear on said shaft, all of said gears being housed in a gear chamber closed by an end plate carrying bearings.

7. An organization as defined in claim 1 in which the notch in said drum is adapted to cooperate alternately with said vanes.

8. An organization as defined in claim 1 in which said vanes are respectively secured to rods co-axial with said rotors.

9. An organization as defined in claim 1 in which said vanes are respectively secured to rods co-axial with said rotors, and in which said rods are simultaneously movable by means comprising a cross head.

10. An organization as defined in claim 1 in which said vanes are shiftable by mechanical means extending to within convenient reach of a driver.

11. An organization as defined in claim 1 in which means are provided for circulating a fluid relatively to said chambers.

12. A hydraulic brake comprising a plurality of parti-cylindrical chambers, each of which contains a rotor; a drum secured, between said rotors, on the shaft whose motion is to be controlled; means rendering the rotation of said shaft and the rotation of said rotors interdependent; operating rods movable to and from said cylinders; and means movable thereby and cooperating with said drum, for checking the rotation of said rotors.

In testimony whereof, I have hereunto set my hand at Los Angeles, California, this 10th day of February, 1925.

NIELS THUESEN.